United States Patent [19]
Khor et al.

[11] Patent Number: 6,025,479
[45] Date of Patent: Feb. 15, 2000

[54] METHOD OF PREPARING WATER SWELLABLE GEL FROM CHITIN

[75] Inventors: Eugene Khor; Andrew Chwee Aun Wan; Garth Winton Hastings, all of Singapore, Singapore

[73] Assignee: National University of Singapore, Singapore

[21] Appl. No.: 08/899,164

[22] Filed: Jul. 23, 1997

[30] Foreign Application Priority Data

Jul. 24, 1996 [SG] Singapore ................................ 9610364

[51] Int. Cl.[7] ............................ C08B 37/08; C08B 15/00
[52] U.S. Cl. ................................ 536/20; 536/56; 536/124
[58] Field of Search ................................ 536/20, 56, 124

[56] References Cited

U.S. PATENT DOCUMENTS 4,302,252  11/1981  Turbak et al. ...................... 106/163 R

OTHER PUBLICATIONS

Hirano, et al.; "Biological Gels: The Gelation of Chitosan and Chitin"; 1991; pp. 181–188 and 396–402.
Rutherford, et al; "The Permeability of Chitin Films to Water And Solutes", in *Chitin, Chitosan . . .* Academic Press 1984, pp. 135–143.
Wan, et al; "Promotion of Calcification on Carboxymethyl-chitin Discs"; Biomaterials 1996, vol. 17, No. 0; Article 320; pp. 1–6.

*Primary Examiner*—Kathleen K. Fonda
*Attorney, Agent, or Firm*—Birch, Stewart, Kolasch & Birch, LLP

[57] ABSTRACT

This invention relates to a method of preparing a form of chitin that has consistent shape in the dry form, is treated chemically such that it will swell when exposed to water to form a gel. The gel can be dried to give the dry form. The gel formation upon absorption/swelling in the presence of water and drying to give the dried form is reversible. The extent of swelling can be varied by suitably varying the chemical treatment.

24 Claims, 2 Drawing Sheets

METHOD OF PREPARING WATER SWELLABLE GEL FROM CHITIN

FIELD OF THE INVENTION

The present invention relates generally to the utilization of biopolymer based materials as gels that can reversibly swell in water. More particularly, the present invention relates to the process of forming and treating chitin to form this gel in a two step process. The biopolymer is first prepared to give a consistent dry form. This dry form is treated chemically to produce a gel that can reversibly swell in the presence of water.

BACKGROUND OF THE INVENTION

Chitin is the second most abundant polysaccharide in nature, after cellulose. It is comprised of N-acetylated glucosamine residues linked via β-1,4 glycosidic bonds, and in nature, has an estimated molecular weight of 1 to $2\times10^6$ daltons. FIG. 1 shows a representative structure of chitin. When the degree of N-acetylation is low (<40%), this polysaccharide is referred to as chitosan. Chitin occurs in nature as a structural component of the insect and crustacean exoskeleton, as well as the fungal cell wall. It is almost always associated with proteins in its role as a fibrous strengthening material.

Chitin was once believed to be an intractable material, but has been found relatively recently to be susceptible to various chemical modifications, especially at the 3 and 6-O positions. These derivatives include among others, various alkyl chitins, carboxymethyl chitin, hydroxyalkyl chitins, cyanoethylchitins and chitin xanthogenates. Chemical reactions used to produce these derivatized chitin are usually carried out heterogenously with alkali-chitin or homogenously, using a solution of chitin in dimethylacetamide (DMAc) in the presence of 5% LiCl. Controlled enzymic or acidic degradation of chitin yields chitooligosaccharides which are also suitable starting materials for similar derivatization reactions.

The primary source of chitin is the shells of crab and shrimp, an abundant by-product of the seafood processing industry. The crude purification procedure includes with dilute hydrochloric acid and removal of protein impurities by alkali treatment. The relatively harmless reagents and waste products involved in chitin purification provides an ecological advantage over the production of cellulose. Potential applications of chitin include use as artificial skin, diet supplement, surgical sutures and in drug delivery systems. On the other hand, the moistening and gel forming properties of chitosan and its derivatives make it usefuil for food and cosmetics applications.

Chitin gels have been referred to in the literature (Hirano et al, in Biotechnology and Polymers, Ed. C. G. Gebelein, Plenum Press, New York, 1991, pp. 181–188). A partially O-acetylated chitin gel was prepared by dissolving chitin with stirring, in a N,N dimethylacetamide/5% LiCl solvent system, adding acetic anhydride and pyridine, and permitting the solution to stand at 100° C. for 6 h. Deacetylation of the latter gel with aqueous NaOH yielded a chitin gel. Hirano also reported the acetylation of a chitosan gel to a chitin gel by reacting the gel with acetic anhydride and described the production of chitin films by air-drying or freeze-drying of chitin gels.

Chitin films have also been referred to in literature. Methods of preparing chitin films vary in terms of casting solution, coagulating agent and/or drying method employed. A chitin membrane was prepared by coagulation of a dimethylacetamide/N-methylpyrollidone/LiCl solution of chitin using 2-propanol, followed by immersion of the membrane in water (S. Aiba et al in Preparation and Properties of Dialysis Membranes, Chitin in Nature and Technology, Ed. R. Muzzarelli, C. Jeuniaux, G. W. Gooday, Plenum Press, New York, 1986, p. 396 prepared). Chitin films have also been prepared by pressing a powdered sample at room temperature followed by heat-treatment in vacuum at 50° C. for three days (M.Kakizaki et al in Molecular Motion and Dielectric Relaxation in Chitin and Acylchitins, Chitin in Nature and Technology, Ed. R. Muzzarelli, C. Jeuniaux, G. W. Gooday, Plenum Press, New York, 1986, p. 39). A chitin film has also been prepared by casting a solution of chitin in N,N dimethylacetamide/5% LiCl and allowing evaporation of the solvent, leading to coalescence of the film (Rutherford and Dunson in The Permeability of Chitin Films to Water and Solutes, Chitin, Chitosan and Related Enzymes, Ed. J. P. Zikakis, Academic Press, New York, 1984, p.136). The coalesced film was washed in acetone and water, blot dry, placed between paper towels and pressed in a book.

6-O-carboxymethyl-chitin is a derivatized form of chitin that is extremely water soluble when the degree of substitution on the 6O group is greater than 0.6. The structure of this derivative is shown in FIG. 2. The derivative is obtained by the reaction of monochloroacetic acid on alkali chitin. This 6-O-carboxymethyl-chitin is very water soluble and is not a gel. Lower degrees of substitution renders the 6-O-carboxymethylchitin insoluble in water. Gels can be obtained from these water insoluble 6-O-carboxymethyl-chitins by first dissolving in 90% formic acid and allowing the evaporation of the acid. This method is tedious, utilizes large amounts of a dangerous acid and the gels obtained do not reversibly swell in water (A.C.A. Wan, E. Khor, J. M. Wong, G. W. Hastings, Promotion of Calcification of Carboxymethyl-chitin Discs", Biomaterials, Britain, in press, March, 1996).

However, There has been no mention in the literature (Hirano et al, in Biotechnology and Polymers, Ed. C. G. Gebelein, Plenum Press, New York, 1991, pp. 181–188) of reacting chitin in the dry form to obtain a gel.

Furthermore, there has also been no mention of obtaining a chitin film by solvent drying. In the method reported by Rutherford and Dunson, (Rutherford and Dunson in The Permeability of Chitin Films to Water and Solutes, Chitin, Chitosan and Related Enzymes, Ed. J. P. Zikakis, Academic Press, New York, 1984, p.136), acetone was used solely for the purpose of washing and not drying the film. The washing procedure is followed by a final wash with water prior to drying to obtain the film. Acetone was not used as a drying agent in a solvent-drying process, which is another object of this present invention.

Finally, there is no known example of chemically reacting chitin in the dry form to produce materials with properties such as reversible swellability in water.

SUMMARY OF THE INVENTION

The present invention relates to a method of producing a reversible water swellable gel from chitin. This can be achieved by first drying solutions of 0.1 to 2% chitin in DMAC-5% LiCl in a manner which circumvents and improves on the limitations previously described. The dried form is subsequently modified by chemical treatment to give the gel.

The process described can also be extended to include other biopolymers such as cellulose or other polysaccharide based biopolymers that can be suitably used as described in the preparation of the gel.

The term "reversible water swellable gel" as used herein refers to the dry form of the biopolymer which has been chemically modified to impart hydrophilic properties to the material.

This invention consists of the method of producing chitin in a form that first produces a chitin gel, followed by a graded way of drying. This comprises:

a). pouring a chitin solution, comprising chitin dissolved in 5% LiCl-DMAc (dimethylacetamide) solvent system, into a mold of dimensions suitable to produce the shape desired for the final product application.

b). controlled, partial evaporation of the solvent DMAc, resulting in the coagulation of chitin into a gel-like substance. This is preferably, but not exclusively, performed in a controlled environment chamber. The mold is placed in this chamber and a cover is placed over it. The top of the cover has holes to ensure graded evaporation of the solvent and thus produce more uniform products. Evaporation rate can be controlled by introducing a vacuum of desired pressure into the chamber or by passing a slow stream of dry air into the chamber.

c). the gel-like substance so obtained is subjected to accelerated effusion of the solvent DMAc, by dialysis of the coagulated chitin gel against several changes of deionized water, for a time period that is suitable to remove the solvent, for example between 1 to 24 hours.

d). subsequently, the DMAc diminished chitin gel is immersed in one or a combination of cleaning/dehydrating solvent(s) from the group of solvents consisting of acetone, ethanol, methanol, ether, ethyl acetate or dichloromethane for one hour or more if deemed appropriate. The purpose is to diffuse out any residual DMAc, LiCl and included water. The dehydrated gel is removed and placed in another container of the same solvent for a further time period. Mixtures of the above solvents can be used, or they may be used separately in succession. The length of drying in the chosen solvent can be varied, in accordance with the dimensions of the sample. Thicker samples require longer periods of drying.

e). finally, the almost dehydrated chitin gel is air-dried. Evaporation of the chosen solvent under controlled conditions gives the final dry form of chitin. Flat samples can be obtained by simply placing weighted glass plates on the samples, on filter paper. The rate at which drying of the sample takes place depends on the volatility of the solvent used. Drying can be attributed to replacement of the liquid phase in the gel (water) with the solvent used for drying. Rapid evaporation of the latter leads to accelerated drying. By employing suitable molds, any preferred shape of the final dried form can be obtained. These forms are directly usable.

The invention further consists of reacting the dried chitin forms prepared. This comprises:

a). exposing the dry chitin form such as a film or strip to appropriate chemical treatment, employing conditions similar to the modification reactions starting from chitin powder.

b). washing the modified chitin strip or film by dialysis against several changes of water or other solvent appropriate to the reaction.

c). air-drying of the modified chitin form, with or without prior solvent drying.

The method of preparing the chemically modified dry form of chitin is convenient as it allows:

a). washing of the final product by dialysis, precluding tedious extraction steps as required in conventional synthesis b). a product to be obtained of equal or similar dimensions as the chitin starting material, which can be used per se, without any further molding steps. This is especially useful for packaging purposes and in the manufacture of biological implant materials.

c). the chemical treatment may be more effective in the dry as compared to the wet (hydrogel) form of chitin. For the reaction of the hydrogel form, the reaction rate is limited by the diffusion of reagents into the liquid phase of the gel, which also dilutes the reagent concentration. This does not apply to the dry form reaction, which has been shown to be more effective for the case of carboxymethylation.

BRIEF DESCRIPTION OF THE DRAWINGS

The accompanying drawings serve to explain the invention only, and not a definition of the limits of the invention for which reference should be made to the claims.

Figure 1:
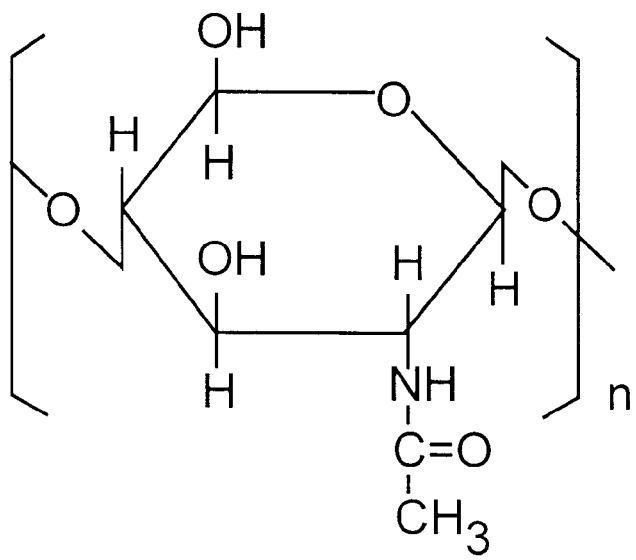
FIG. 1 shows a representative structure of chitin.
Figure 2:
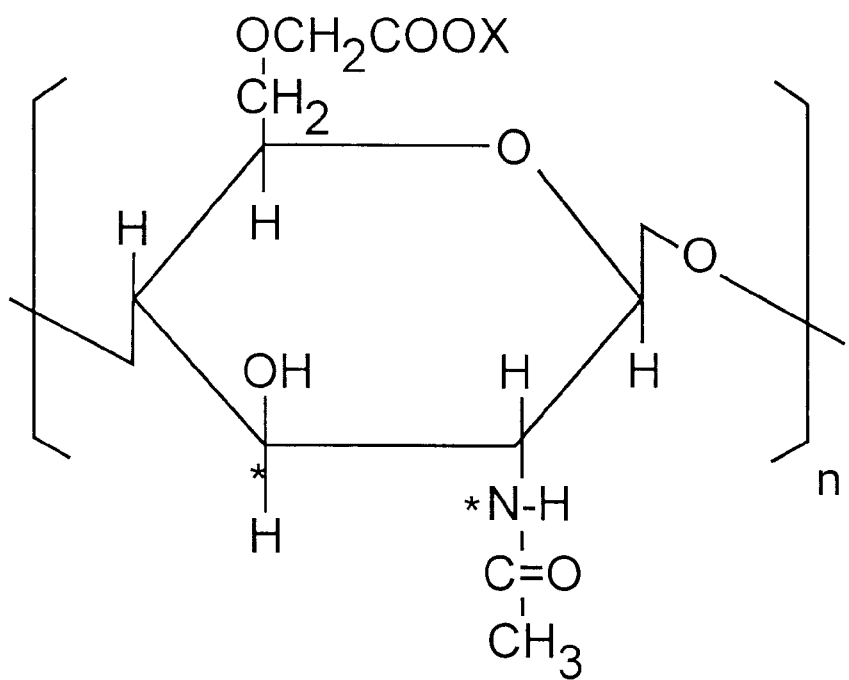
FIG. 2 shows the derivative structure of 6-O-carboxymethyl-chitin. Where X is hydrogen, H-form; where X is Na, sodium form; where X is K, potassium form. The derivative is obtained by the reaction of monochloroacetic acid on alkali chitin. This 6-O-carboxymethyl-chitin is very water soluble and is not a gel. Lower degrees of substitution renders the 6-O-carboxymethyl-chitin insoluble in water.
Figure 3:
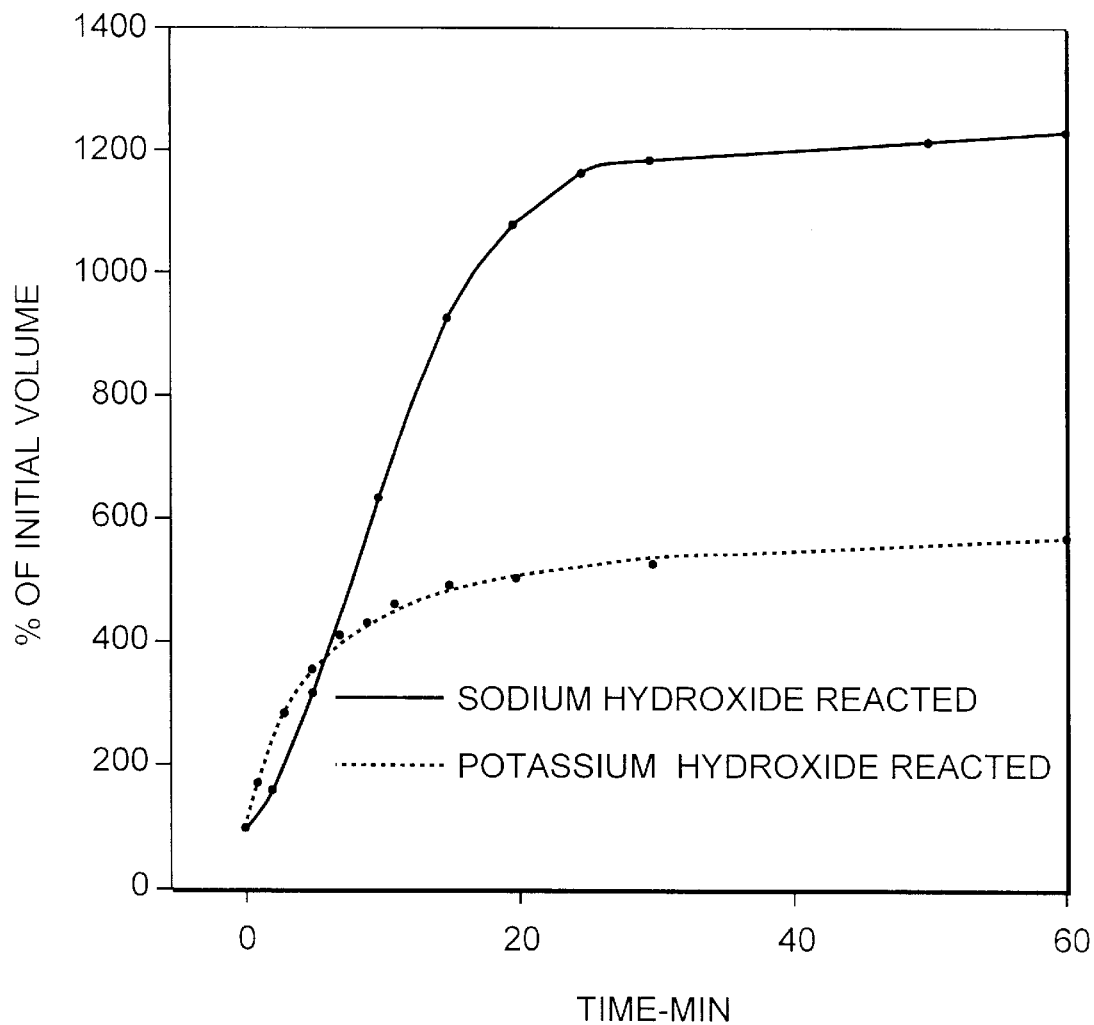
FIG. 3 shows the water swelling characteristics of the reversible swellable gels by the uptake of water with time for samples obtained with sodium hydroxide as the coreactant and when potassium hydroxide was used as the co-reactant Uptake of water occurs very rapidly in the first twenty minutes after which saturation sets in. The increase in volume of water is in excess of 500% the original volume of the sample. The time required to achieve half the maximum swelling volume is approximately 10 minutes for the gel when potassium hydroxide is the co-reactant and approximately 4.8 minutes for the gel when sodium hydroxide is the co-reactant. The maximum swelling is approximately 1230% for the gel when potassium hydroxide is the co-reactant and approximately 610% for the gel when sodium hydroxide is the co-reactant. When removed from water, they can be dried to their original size. Upon re-soaking in water, they again take up water. Hence the process is reversible. The reversible gel retains this property even when subjected to steam sterilization.

ILLUSTRATIVE METHODS AND EXAMPLES FOR PRODUCING REVERSIBLY WATER SWELLABLE GELS FROM CHITIN

Given below are several specific illustrative techniques and examples for producing these reversible water swellable gels in accordance with the principles of the invention. Although directed primarily to the preparation of reversible water swellable gels, the techniques described herein are applicable to the creation of any other chemically modified forms of chitin. It should be noted that these illustrative techniques are for illustration purposes only, and can be varied to achieve an optimal degree of swelling, or to swell in solvents not water. Moreover, these illustrative methods and examples are for purposes of illustrating the present invention, and are not to be construed as limiting of the claims.

Example 1

Chitin strips were prepared in the following way: a chitin gel was prepared by dissolving chitin in a N,N-dimethylacetamide/5% LiCl solvent system and allowing the solution to stand for several hours until gelation is obtained. The gel was dialyzed against deionized water, followed by solvent drying by the method described above, using acetone. The chitin strips (5×2 cm), thickness 0.5–0.6 mm, were activated in a solution of 50% sodium hydroxide (NaOH) at −20° C., overnight. These strips were added (minus the NaOH solution) to a solution of 5.4 g chloroacetic acid in 30 ml isopropanol, simultaneously with 10 ml of 50% sodium hydroxide (NaOH) which was previously cooled to −20° C. The reaction mixture was magnetically stirred for 2 hours at room temperature. The strips were retrieved and dialyzed against several changes of deionized water for a suitable time period of at least 1 hour, but longer time periods are preferred. The acid form of the carboxymethylated strips were obtained by immersing the strips in 1 N HCl for 15 min, followed by washing off of the excess acid using deionized water. The strips were solvent dried in acetone, as outlined earlier, to obtain flat strips of dimensions approaching that of the unreacted sample.

The carboxymethylated chitin strips (sodium salt form) prepared as described in this example were more water interactive, as compared to the original chitin strips. This is attributed to the hydrophilicity of the carboxymethyl groups. Thus, these strips showed a considerable degree of water swelling, most of which took place within 15 minutes of immersion in water. Depending on film thickness, the degree of swelling varied between 400% to 800% by volume. This water swellabillity was found to be reversible, i.e. swelling and drying could be performed repeatedly without visibly affecting the physical properties of the polymer. This reversible CM-chitin gel could also be sterilized by steam autoclaving, which dispenses the need for chemical sterilisation. The dry form of the strip absorbs about five times its weight of water, thus, transportation costs may be reduced by packaging the material in the dry form.

Example 2

The procedure described in example 1 is followed except that potassium hydroxide (KOH) is used in place of sodium hydroxide (NaOH). This gives a dry form that swells more than forms obtained when NaOH is used.

Industrial Applicability

The present inventors have discovered that a gel that reversibly swells in the presence of water can be produced by chemically treating chitin in the dried form to give gels with properties such as reversible swellability in water. The method of producing this gel obviates the use of formic acid and renders the reversibility of the water absorption process possible. This gel is potentially useful for the immobilization of biological molecules, as a support for biochemical reactions, in the production of artificial seeds or sub-dermal implant devices.

What is claimed is:

1. A process for producing a reversibly swellable polysaccharide gel, comprising:

a) forming a polysaccharide gel by dissolving a polysaccharide polymer in N,N dimethylacetamide;

b) dialyzing the polysaccharide gel and solvent drying the dialyzed polysaccharide gel to obtain a dried gel;

c) treating the dried gel with a solution comprising up to 50% NaOH or up to 50% KOH;

d) adding the treated gel to a solution of chloroacetic acid in alcohol;

e) separating the gel from the chloroacetic acid solution;

f) washing the gel;

g) acidifying the gel; and h) drying the gel to obtain a dried, reversibly swellable polysaccharide gel.

2. The process of claim 1, wherein said N,N dimethylacetamide further comprises 5% lithium chloride.

3. The process of claim 1, wherein said alcohol is isopropanol.

4. The process of claim 2, wherein said alcohol is isopropanol.

5. The process of claim 2, wherein the dialysis step b) and the washing step f) are performed with water.

6. The process of claim 1, wherein the acidifying step g) is performed using hydrochloric acid.

7. The process of claim 2, wherein the acidifying step g) is performed using hydrochloric acid.

8. The process of claim 3, wherein the acidifying step g) is performed using hydrochloric acid.

9. The process of claim 1, wherein the drying step h) is performed by air drying or solvent drying.

10. The process of claim 2, wherein the drying step h) is performed by air drying or solvent drying.

11. The process of claim 3, wherein the drying step h) is performed by air drying or solvent drying.

12. The process of claim 4, wherein the drying step h) is performed by air drying or solvent drying.

13. The process of claim 5, wherein the drying step h) is performed by air drying or solvent drying.

14. The process of claim 6, wherein the drying step h) is performed by air drying or solvent drying.

15. The process of claim 1, wherein the polysaccharide, gel is formed by casting, extrusion or molding prior to the dialyzing step b).

16. The process of claim 1, wherein the polysaccharide polymer is cellulose.

17. The process of claim 1, wherein the ploysaccharide polymer is chitin.

18. The process of claim 2, wherein the polysaccharide polymer is chitin.

19. The process of claim 3, wherein the polysaccharide polymer is chitin.

20. The process of claim 4, wherein the polysaccharide polymer is chitin.

21. The process of claim 5, wherein the polysaccharide polymer is chitin.

22. The process of claim 6, wherein the polysaccharide polymer is chitin.

23. The process of claim 7, wherein the polysaccharide polymer is chitin.

24. The process of claim 8, wherein the polysaccharide polymer is chitin.

* * * * *